United States Patent [19]

Lee et al.

[11] Patent Number: 4,900,564
[45] Date of Patent: Feb. 13, 1990

[54] STABILIZATION OF WINE WITH HONEY AND SO$_2$

[75] Inventors: Chang Y. Lee, Ithaca; Robert W. Kime, Romulus, both of N.Y.

[73] Assignee: Cornell Research Foundation, Inc., Ithaca, N.Y.

[21] Appl. No.: 287,550

[22] Filed: Dec. 19, 1988

Related U.S. Application Data

[63] Continuation of Ser. No. 68,596, Jul. 1, 1987, abandoned.

[51] Int. Cl.$^4$ ............................................. C12G 1/00
[52] U.S. Cl. ........................................ 426/15; 426/51; 426/269; 426/592; 426/599; 426/330.4; 426/330.5; 426/654; 426/658
[58] Field of Search ................. 426/262, 268, 270, 12, 426/15, 51, 52, 573, 577, 592, 599, 654, 658, 422, 490, 495, 269, 330.4, 330.5

[56] References Cited

U.S. PATENT DOCUMENTS

| | | |
|---|---|---|
| 1,842,673 | 5/1929 | Joseph . |
| 2,690,972 | 10/1954 | Bradshaw . |
| 3,041,175 | 6/1962 | Atkinson et al. . |
| 3,146,107 | 8/1964 | Elder et al. . |
| 3,236,655 | 2/1966 | Murch et al. . |
| 3,347,678 | 10/1967 | Villadsen et al. . |
| 4,089,985 | 5/1978 | Wolff . |
| 4,327,115 | 4/1982 | Kime ..................................... 426/12 |

FOREIGN PATENT DOCUMENTS

| | | |
|---|---|---|
| 979829 | 12/1975 | Canada . |
| 52-3864 | 1/1977 | Japan . |

OTHER PUBLICATIONS

Vineyard & Winery Management, Jul./Aug. 1986 p. 47.
Fabian, Fruit Products J., 14:363–366 (1935).
Kime et al., American Bee J., 127:270–271 (1987).
Amerine et al., "The Technology of Wine Making" 1972, Avi Pub. Co., Westport Conn. pp. 400, 445, 498.
Lee et al., J. Apicultural res., 23:45–49 (1984).
Lee, J. Apicultural Res., 23:106–109 (1984).
Lee et al., J. Apicultural Res., 24: 190–194 (1985).

*Primary Examiner*—Marianne Cintins

[57] ABSTRACT

A method for the color stabilization of fresh, pasteurized, and fermented fruit juices by the use of honey or a color stabilizing protein extract of honey as a stabilizing agent.

5 Claims, No Drawings

STABILIZATION OF WINE WITH HONEY AND SO₂

This application is a continuation of application Ser. No. 068,596, filed July 1, 1987, now abandoned.

BACKGROUND OF THE INVENTION

U.S. Pat. No. 4,327,115 describes the clarification of fruit juice including fermented juice, i.e. wine, by the use of honey. Further publications by Lee et al elucidated the activity, a protein-phenolic compound interaction, and characterized the protein responsible; see Lee et al, *J. Apicultural Res.* 23: 45–49 (1984); *J. Apricultural Res.* 24: 106–109 (1984) and *J. Apricultural Res.* 24: 190–194 (1985).

The discoloration of fruit juices, particularly grape juices and wine, especially the so called white juices or wine, which actually range in color from white to amber, has always been a substantial problem. For years and still today, many juices and wines are stabilized against discoloration (apparently by oxidation) by the addition of $SO_2$.

Recently $SO_2$ and sulfites have come under attack as a food additive on the basis that they appear to cause allergic reactions in certain persons.

DESCRIPTION OF THE INVENTION

The present invention relates to a method for color stabilization of fresh, pasteurized and fermented fruit juices, particularly grape juices by the use of honey as a stabilizing agent or alternatively by the addition of a protein fraction derived from honey; the protein fraction being a color stabilizing protein fraction. In a preferred embodiment, both honey and $SO_2$ are used in combination, said $SO_2$ being used in an amount less than 50 ppm, or preferably, in an amount up to about 25 ppm.

Fresh or pasteurized juices which can be color stabilized include, among others, apple juice, grape juice, pear juice and berry juice. Fermented fruit juices include those of the fresh juices listed above, including hard sweet apple cider, and apple and grape wines.

The term honey as used herein refers to all commercially available honeys, such as, but not limited to, sunflower honey, buckwheat honey, and clover honey, as well as blends of these honeys.

In carrying out the stabilization process of the invention, honey or the honey derived stabilizing protein is added to the fruit juice, e.g. grape juice to be stabilized in an amount sufficient to accomplish the desired color stabilization. This amount is usually at least about one weight percent of honey per weight of juice to be stabilized; preferably the amount is between about 2 and 4 weight percent. While any amount of honey greater than about 1 weight percent of the juice can be used to perform the stabilization process of the invention, due to commercial expense and the diminution of any additive effect, typically amounts greater than 10 percent of honey, would not be employed. Preferably the amount of honey employed in the present invention is from about 1 to 10 weight percent and most preferably from 2 to 5 weight percent of the weight of the juice to be color stabilized.

To the extent that the amount of browning-contributing phenolic compounds in juices varies depending on the fruit, growing conditions, ripeness, and the process steps to which the fruit or juice is subjected, the amount of honey which is a color stabilizing amount can vary, but a minimum stabilizing amount can be routinely determined.

It should be noted that if honey is added to the fruit juice which is not subsequently fermented, the honey adds additional sweetness.

The honey and juice mixture is typically agitated in the manner sufficient to promote effective dispersion of the honey.

It is noted that where the fruit juice has not been clarified or where additional clarification is necessary, the honey is added and the material treated as described in U.S. Pat. No. 4,327,115. After the resultant precipitate has been separated from the juice, depending on the amount of honey added, the juice at that point may be inherently stabilized; other color stabilizers such as $SO_2$ can be omitted (or used in lesser amounts). On the other hand, if desired, additional honey may be added at this point.

Where preclarification is desired, any number of clarifying procedures well known in the art can be employing, including the use of bentonite, sparkolloid gelatin and clarifying enzymes such as Klerzyme.

The temperature at which the honey is added is not unduly critical, when it is added solely for the purpose of color stabilization. Typically after the honey is added the temperature is maintained between about 35° F. and about 90° F. for at least several hours.

The time at which the honey is added is not unduly critical, for example with grapes, the grapes may be contacted with honey before they are crushed, comminuted and strained into juice. Thus it is contemplated that the scope of the claims of the present invention encompass the use of the stabilizing agent in any step of the fruit juice or wine production process. With respect to wine, in order to not unduly increase the amount of residual sugar remaining and therefore produce a sweet wine, it is preferred to add the honey at some point prior to the beginning of fermentation or reasonably early in the primary fermentation process where substantial amounts of yeast remain active so that the sugar content of the honey is fermented and does not augment the residual sugar content of the final wine.

Where juices are ameliorated prior to fermentation it is convenient to add the honey as a portion of the amelioration process, taking into account the amount of sugar contained in the honey.

It is also within the contemplation of this invention to replace whole honey with a proportional part of the honey or at least the oxidation inhibiting protein contained in honey. The weight percent of the protein containing fraction of the honey can be adjusted in proportion to the amount of protein contained in the whole honey. This level varies significantly but is usually between 50 to 300 mg of protein/100 grams of honey (See Lee et al 1985 supra).

The browning of fruit juices, for example grape juice and white wines appears to be related to certain phenolic compounds contained in the juice. Based upon collected data, it appears that phenolic compounds catechin and epicatechin are major contributors to the browning phenomenon. Table 1 sets forth the relative proportion of certain phenolic compounds measured in various grape cultivars.

TABLE 1

PHENOLICS IN GRAPES IN RELATION TO BROWNING

| Grape Cultivars | Browning A420 | trans-Caffeoyl | cis-Coumaroyl | t-Coumaroyl | Catechin | Epi-catechin | Procyanidin B1 | Procyanidin B2 | Procyanidin B3 | Cat + Epicat |
|---|---|---|---|---|---|---|---|---|---|---|
| Freisamer | 0.42 | 243 | 8 | 12 | 46 | 34 | 0 | 10 | 20 | 80 |
| Metternich | 0.39 | 61 | 3 | 3 | 33 | 32 | 1 | 11 | 8 | 65 |
| Niagara | 0.35 | 283 | 7 | 9 | 13 | 31 | 6 | 7 | 8 | 44 |
| Aurore | 0.34 | 106 | 5 | 5 | 46 | 20 | 4 | 3 | 4 | 66 |
| Riesling | 0 34 | 72 | 3 | 5 | 10 | 33 | 2 | 7 | 3 | 43 |
| Pinot Blanc | 0.32 | 218 | 1 | 9 | 42 | 48 | 7 | 10 | 64 | 90 |
| Melon | 0.30 | 297 | 1 | 3 | 46 | 63 | 3 | 12 | 29 | 109 |
| Bacchus | 0 28 | 285 | 8 | 12 | 20 | 22 | 3 | 8 | 14 | 42 |
| Muscat Ottonel | 0.27 | 42 | 8 | 12 | 12 | 31 | 0 | 3 | 3 | 43 |
| Sylvaner | 0.27 | 196 | 8 | 12 | 7 | 7 | 2 | 1 | 36 | 14 |
| Ehrenfelser | 0.26 | 251 | 3 | 1 | 0 | 17 | 1 | 1 | 23 | 17 |
| Kerner | 0.26 | 172 | 8 | 10 | 14 | 13 | 0 | 1 | 22 | 27 |
| Chardonnay | 0.25 | 152 | 5 | 2 | 7 | 13 | 0 | 3 | 6 | 20 |
| Sauv. Blanc | 0.25 | 95 | 8 | 10 | 12 | 18 | 1 | 4 | 6 | 30 |
| Melody | 0.24 | 194 | 10 | 32 | 2 | 5 | 0 | 2 | 25 | 7 |
| Rieslaner | 0.24 | 207 | 10 | 34 | 2 | 13 | 0 | 8 | 8 | 15 |
| Chasselas Dore | 0.23 | 128 | 12 | 17 | 15 | 13 | 0 | 3 | 7 | 28 |
| Baroque | 0.22 | 46 | 1 | 6 | 2 | 20 | 0 | 5 | 6 | 22 |
| Seyval | 0.21 | 298 | 4 | 3 | 9 | 15 | 0 | 5 | 6 | 24 |
| Ravat 34 | 0.20 | 72 | 8 | 5 | 58 | 28 | 0 | 5 | 13 | 86 |
| Dutchess | 0.18 | 397 | 7 | 12 | 17 | 17 | 2 | 5 | 12 | 34 |

In the following examples are to be considered illustrative rather than limiting. Parts and percentages referred to in the examples and throughout the specification are by weight unless otherwise indicated.

EXAMPLE 1

(A) Various grape juices were fermented to make white wines. Except for the addition of honey (or any other indicated change) the fermentation process was conventional and consistant.

Grapes were destemmed and crushed. About 50 ppm $SO_2$ (conv.) in the form of sodium metabisulfite was added and the crushed grapes cold pressed. The juice was adjusted to 22° Brix with sucrose. The resultant mixture was then ameliorated with 15% by volume of a 22% acqueous sucrose solution. An active yeast culture was added. Fermentation was conducted for about one month before first racking.

The organoleptic tests in this experiment (A) were done by a panel of eight employees trained as testers. The evaluation was on a scale of 10, 10 being the best and 0 the worst. The tests were repeated and the two values averaged.

USE OF HONEY IN FERMENTATION

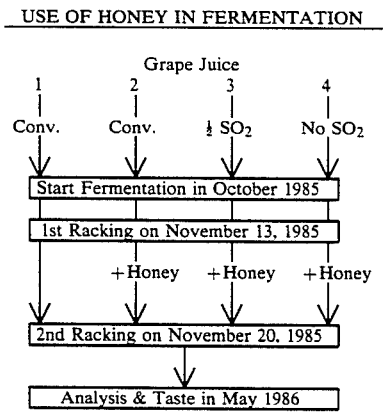

| | | RIESLING WINE | | | | | |
|---|---|---|---|---|---|---|---|
| Treatment | pH | TA (%) | EtOH (%) | Sugar (%) | Color (A420) | $SO_2$ (ppm²) | Tannin (mg/ml) |
| 1 | 3.04 | 0.66 | 12.5 | 0.17 | 0.065 | 12.6 | 0.16 |
| 4 | 3.12 | 0.64 | 12.8 | 0.30 | 0.068 | 4.3 | 0.10 |

Free $SO_2$: Total sugar

| | | AURORE WINE | | | | | |
|---|---|---|---|---|---|---|---|
| Treatment | pH | TA (%) | EtOH (%) | Sugar (%) | Color (A420) | $SO_2$ (ppm²) | Tannin (mg/ml) |
| 1 | 3.34 | 0.60 | 11.6 | 0.11 | 0.099 | 16.1 | 0.24 |
| 2 | 3.37 | 0.61 | 12.4 | 1.26 | 0.098 | 12.6 | 0.22 |
| 3 | 3.38 | 0.62 | 12.1 | 1.20 | 0.121 | 9.4 | 0.21 |
| 4 | 3.41 | 0.63 | 11.9 | 1.55 | 0.144 | 12.0[1] | 0.21 |

Free $SO_2$: Total sugar
[1]Treatment 4 displayed a sudden unexplained darkening which appeared associated with a faulty container (a large head space). An additional 20 ppm $SO_2$ was added to the container.

| | | CATAWBA WINE | | | | | |
|---|---|---|---|---|---|---|---|
| Treatment | pH | TA (%) | EtOH (%) | Sugar (%) | Color (A420) | $SO_2$ (ppm²) | Tannin (mg/ml) |
| 1 | 3.29 | 0.71 | 11.6 | 0.15 | 0.146 | 12.9 | 0.29 |
| 2 | 3.37 | 0.66 | 11.8 | 1.52 | 0.186 | 8.0 | 0.26 |
| 3 | 3.36 | 0.67 | 11.9 | 1.40 | 0.375 | 5.2 | 0.25 |
| 4 | 3.28 | 0.65 | 11.8 | 1.40 | 0.355 | 4.6 | 0.25 |

Free $SO_2$: Total sugar

| ORGANOLEPTIC TEST OF RIESLING WINE | | |
|---|---|---|
| | Treatment | |
| | 1 | 4 |
| Color | 6.54 | 6.68 |
| Flavor | 5.11 | 6.11 |
| Overall Preference | 4.40 | 6.14 |

| ORGANOLEPTIC TEST OF AURORE WINE | | | | |
|---|---|---|---|---|
| | Treatment | | | |
| | 1 | 2 | 3 | 4 |
| Color | 7.00$^a$ | 6.60$^a$ | 4.33$^b$ | 5.82$^{ab}$ |
| Flavor | 5.98$^{ab}$ | 6.68$^a$ | 4 68$^b$ | 5.70$^{ab}$ |
| Preference | 6.24$^{ab}$ | 6.71$^a$ | 4.38$^b$ | 5.51$^{ab}$ |

Statistical difference at 95% level

| ORGANOLEPTIC TEST OF CATAWBA WINE | | | | | |
|---|---|---|---|---|---|
| | Treatment | | | | |
| | 1 | 2 | 3 | 4 | 5 |
| Color | 4.66 | 5.31 | 4.71 | 4.85 | 4.97 |
| Flavor | 5.31 | 5.30 | 3.97 | 4.84 | 4.75 |
| preference | 5 28 | 5.58 | 3.91 | 5.05 | 4.95 |

It was noted that honey added after the primary fermentation was completed resulted in higher residual sugar contents in the wines compared to the same wine where no honey was added.

Additional fermentations where the honey was added before fermentation was started were conducted as follows:

(B) Grapes processed and fermented as in (A) above, except that the process flow was as follows:

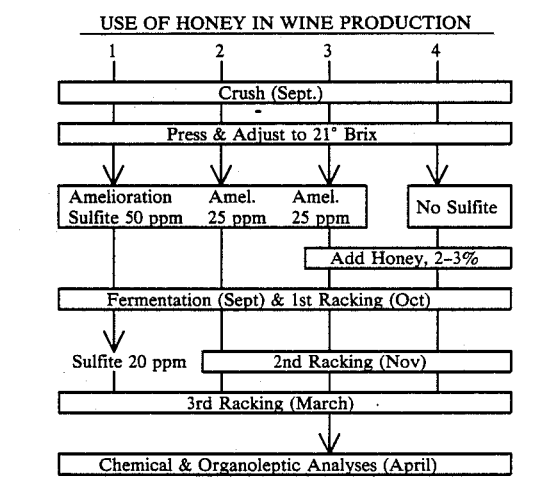

USE OF HONEY IN WINE PRODUCTION

| AURORE WINES | | | | | |
|---|---|---|---|---|---|
| | Treatment | | | | |
| | 1 | 2 | 3 | 4 | Com |
| Color | 5.62 | 6.25 | 5.87 | 5.25 | 5.75 |
| Aroma | 5.37 | 5.00 | 5.87 | 5.25 | 5.12 |
| Overall | 5.12 | 5.12 | 5.62 | 4.87 | 5.87 |

| REISLING WINES | | | | | |
|---|---|---|---|---|---|
| | Treatment | | | | |
| | 1 | 2 | 3 | 4 | Com |
| Color | 6.62$^a$ | 6.00$^{ab}$ | 6.50$^a$ | 4.87$^b$ | 6.50$^a$ |
| Aroma | 3.75$^a$ | 5.75$^{ab}$ | 5.62$^{ab}$ | 5.37$^{ab}$ | 6.50$^b$ |
| Overall | 4.12$^{ab}$ | 5.25$^{bc}$ | 4.87$^{ab}$ | 5.00$^b$ | 6.78$^c$ | a, b, c subscripts are significantly different at 95% level

| REISLING WINES | | | | |
|---|---|---|---|---|
| | Treatment | | | |
| | 1 | 2 | 3 | 4 |
| pH | 3.37 | 3.28 | 3.24 | 3.24 |
| Sugar (%) | 0.05 | 0.05 | 0.10 | 0.10 |
| Alcohol (%) | 12.9 | 13.2 | 13.6 | 13.5 |
| Color (A420) | 0.074 | 0.075 | 0.089 | 0.077 |
| TA (%) | 0.765 | 0.724 | 0.677 | 0.682 |
| SO$_2$ (ppm) | | | | |
| free | 14.87 | 11.39 | 7.75 | 8.31 |
| total | 34.41 | 16.97 | 12.32 | 14.49 |

| AURORE WINES | | | | |
|---|---|---|---|---|
| | Treatment | | | |
| | 1 | 2 | 3 | 4 |
| pH | 3.40 | 3.50 | 3.52 | 3.40 |
| Sugar (%) | 0.05 | 0.05 | 0.05 | 0.05 |
| Alcohol (%) | 12.7 | 13.4 | 13.6 | 12.8 |
| Color (A420) | 0.063 | 0.082 | 0.077 | 0.097 |
| TA (%) | 0.657 | 0.630 | 0.619 | 0.685 |
| SO$_2$ (ppm) | | | | |
| free | 20.52 | 18.84 | 17.40 | 13.52 |
| total | 44.59 | 29.90 | 32.68 | 21.60 |

| NIAGARA WINES | | | | |
|---|---|---|---|---|
| | Treatment | | | |
| | 1 | 2 | 3 | Com |
| Color | 4.25$^{ab}$ | 3.00$^a$ | 5.25$^{ab}$ | 6.00$^b$ |
| Aroma | 4.62 | 4.00 | 4.62 | 4.37 |
| Overall | 4.50 | 4.12 | 3.75 | 4.75 | a, b subscripts are significantly different at 95% level

| RAVAT 34 WINES | | | | |
|---|---|---|---|---|
| | Treatment | | | |
| | 1 | 2 | 3 | Com |
| Color | 5.37$^a$ | 6.12$^a$ | 3.00$^a$ | 5.75$^a$ |
| Aroma | 3.75$^{ab}$ | 4.12$^{ab}$ | 4.62$^{ab}$ | 5.50$^b$ |
| Overall | 4.12$^{ab}$ | 4 75$^{ab}$ | 4.62$^{ab}$ | 5.87$^b$ | a, b subscripts are significantly different at 95% level

| RAVAT 34 WINES | | | |
|---|---|---|---|
| | Treatment | | |
| | 1 | 3 | 4 |
| pH | 3.40 | 3.35 | 3.55 |
| Sugar (%) | 0.05 | 0.05 | 0.10 |
| Alcohol (%) | 12.4 | 13.4 | 12.8 |
| Color (A420) | 0.085 | 0.078 | 0.114 |
| TA (%) | 0.636 | 0.628 | 0.623 |
| SO$_2$ (ppm) | | | |
| free | 22.24 | 18.64 | 14.78 |
| total | 37.23 | 26.74 | 23.75 |

| NIAGARA WINES | | | |
|---|---|---|---|
| | Treatment | | |
| | 1 | 3 | 4 |
| pH | 3.20 | 3.16 | 3.19 |
| Sugar (%) | 0.05 | 0.05 | 0.10 |
| Alcohol (%) | 13.4 | 13.8 | 13.2 |
| Color (A420) | 0.199 | 0.192 | 0.162 |
| TA (%) | 0.624 | 0.630 | 0.609 |

-continued

| NIAGARA WINES | | | |
|---|---|---|---|
| | Treatment | | |
| | 1 | 3 | 4 |
| SO₂ (ppm) | | | |
| free | 11.27 | 8.67 | 3.63 |
| total | 22.03 | 15.32 | 5.96 |

It is noted that the taste panel in this experiment (B) was a group of nine wine industry executives and workers who volunteered during a visit to the research facility. There were no replications.

In some of the Tables above, the final column "Com" refers to a commercial wine from the same grape variety purchased at random through a commercial outlet.

EXAMPLE 2

As more completely described in Lee et al *J. Apicultural Res.* 24: 190-194 (1985), honey proteins of various floral types were separated into 4-5 fractions on a Sephadex G-150 column. A typical elution profile (for white dutch clover honey) is shown in FIG. 1. However, the protein concentrate of sucrose honey separated into only 3 fractions. In all honey concentrates, the first peak (fraction A) appeared to be the major protein component, the others being relatively small. The elution profiles were similar to those of White and Kushnir *J. Apicultural Res.* 6: 163-178 (1967) and Bergner and Diemair *Z. Lebensmittelunters. u.-Forsch* 157: 7-13 (1975). Interestingly, protein concentrates of all 7 samples showed an identical elution profile of fractions A and B. This indicated that the major protein component of these 2 fractions may originate in the bees. When the pooled protein fractions were added individually to apple juice (at the same protein/juice ratio), it was observed that only fraction A had clarifying activity in apple juice. Therefore, it appears that only a certain protein component is capable of forming complexes with apple phenolics.

Acrylamide gel electropherograms of honey protein concentrates, fraction A and fraction B of locust honey, white dutch clover honey, and sucrose honey are shown in FIG. 2. The number of protein bands on the gel varied among the different varieties of honey. Locust honey had a total of 11 bands and white dutch clover honey 9 bands, whereas sucrose honey had only 6 bands. However, all 7 samples showed 2 major protein bands of the same electrophoretic pattern, indicating that those 2 bands originated in the bees. Therefore, it was concluded that the major part of the honey protein is not related to the nectar of the flowers visited by the bees, but is supplied by the bees themselves.

The two major bands or protein concentrate were separated into fractions A and B (FIG. 1). Since fraction A showed the clarifying activity, it appears that one of two major bands in honey protein that separated into fraction A is the one responsible for the stabilization reaction. Attempts were made to separate further the protein bands of fraction A by using different column materials (e.g., Phenyl Sepharose) or chromatographic conditions (different strength of eluent) in order to isolate a single protein band responsible for the clarification reaction, but they were unsuccessful.

It appears that honey protein which as a major electrophoresis band between about $R_f.23$ and $R_f.30$ appears to have color stabilizing activity. To date, only one honey harvested from *A. laboriosa* bees in Chhomrong, Nepal at an attitude of about 2,000 m has been found to not contain a suitable protein. Honey from *Apis mellifera*, the bee common to the United States is preferred. Honey from *A. cerana* has also proven effective.

We claim:

1. In a process for making wine from grapes comprising crushing the grapes, cold pressing, adding active yeast culture and fermenting, the improvement comprising adding both honey and SO₂ in a total amount effective to inhibit browning discoloration, said honey being added before or during fermentation, said SO₂ being added in an amount less than 50 ppm.

2. The process of claim 1 wherein said SO₂ is added in an amount up to about 25 ppm.

3. The process of claim 2 wherein said SO₂ is added before or during fermentation.

4. The process of claim 3 wherein said SO₂ is added as sodium metabisulfate.

5. The process of claim 1 wherein said SO₂ is added before or during fermentation.

* * * * *

UNITED STATES PATENT AND TRADEMARK OFFICE
CERTIFICATE OF CORRECTION

PATENT NO. : 4,900,564

DATED : February 13, 1990

INVENTOR(S) : CHANG Y. LEE ET AL

It is certified that error appears in the above-identified patent and that said Letters Patent is hereby corrected as shown below:

On the cover page under "OTHER PUBLICATIONS" the page numbers for Amerine et al should include 188-191.

Claim 4 (column 8, line 42), "metabisulfate" should be --metabisulfite--.

Signed and Sealed this

Fifteenth Day of January, 1991

Attest:

HARRY F. MANBECK, JR.

*Attesting Officer*      *Commissioner of Patents and Trademarks*